H. A. HOLDER.
PNEUMATIC ROLL FOR LEATHER WORKING MACHINES.
APPLICATION FILED MAY 5, 1913.
1,067,607.
Patented July 15, 1913.
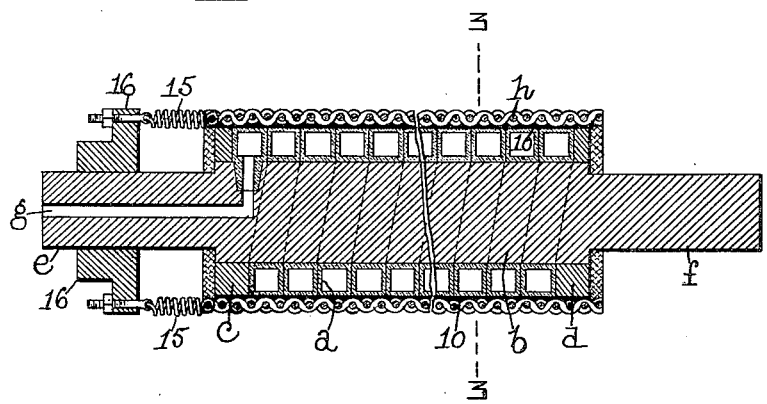
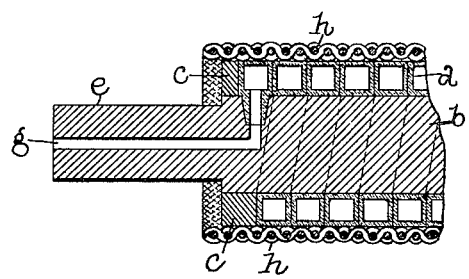
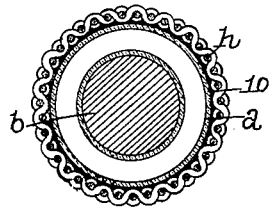
WITNESSES:
INVENTOR:
Henry A. Holder
By Jas. H. Churchill
Atty.

UNITED STATES PATENT OFFICE.

HENRY A. HOLDER, OF LYNN, MASSACHUSETTS, ASSIGNOR TO HOLDER-PERKINS COMPANY, OF WOBURN, MASSACHUSETTS, A CORPORATION OF MASSACHUSETTS.

PNEUMATIC ROLL FOR LEATHER-WORKING MACHINES.

1,067,607. Specification of Letters Patent. Patented July 15, 1913.

Application filed May 5, 1913. Serial No. 765,454.

*To all whom it may concern:*

Be it known that I, HENRY A. HOLDER, a citizen of the United States, residing in Lynn, in the county of Essex and State of Massachusetts, have invented an Improvement in Pneumatic Rolls for Leather-Working Machines, of which the following description, in connection with the accompanying drawings, is a specification, like letters on the drawings representing like parts.

This invention relates to a pneumatic work support and is herein shown as embodied in a roll for hide and leather working machines, and has for its object to provide a simple, inexpensive and efficient pneumatic roll, which can be used as a bed roll in machines of the class described, as a substitute for the ordinary rubber covered bed roll, without decreasing the length of the work supporting surface or necessitating any change in the bladed working cylinder employed in said machines, and without danger of injuring the work or the roll itself, as will be described. To this end, the pneumatic roll is provided with a pneumatic member arranged about a center member which forms a solid backing for the pneumatic member, and with a substantially non-stretchable sleeve of fibrous material, which envelops the pneumatic member and extends beyond the ends of the latter and is free to move in the direction of its length under external pressure, as will be described. The non-stretchable sleeve may be vulcanized to the pneumatic member or it may be loose thereon as will be described. These and other features of this invention will be pointed out in the claims at the end of this specification.

Figure 1 is a longitudinal section of one form of pneumatic roll embodying this invention. Fig. 2, a modification to be referred to, and Fig. 3, a cross section on the line 3—3, Fig. 1.

The pneumatic member shown in the drawing consists of a rubber tube $a$, which is wound about a cylindrical center or supporting member, shown as a shaft $b$, provided at its ends with headers or disks $c$, $d$, between which the rubber tube $a$ is confined against longitudinal displacement. The shaft $b$ is provided with the journals $e$, $f$, one of which as $e$ is provided with a passage $g$, which communicates with the air tube $a$ and with a suitable source of air under pressure (not shown). The air tube is enveloped by a practically non-extensible cylindrical sleeve $h$ of fibrous material, such for instance as a closely woven sleeve of canvas or like material, and said sleeve is made of greater length than the pneumatic member $a$ and of sufficient length to cover and preferably extended beyond the headers $c$, $d$.

The sleeve $h$ may be referred to as the canvas sleeve and it may be vulcanized to the pneumatic member $a$ as represented by the heavy black line 10 in Fig. 1, or said sleeve may be left free from the pneumatic member as shown in Fig. 2. The canvas sleeve $h$ is made of such strength as to withstand the air pressure within the pneumatic member and any increase thereof due to external pressure of the bladed cylinder, not shown, upon the hide or skin supported by the pneumatic roll, yet is capable of movement toward the shaft $b$ under said external pressure in order to compensate for irregularities in the thickness of the hide or skin. One or both ends of the canvas sleeve $h$ is or are left free to move in the direction of the length of the roll, so as to enable the work supporting portion of the said sleeve between the headers $c$, $d$, to be moved toward the center of the roll by the external pressure referred to, and said sleeve is made long enough to take care of this transverse movement without uncovering the ends of the pneumatic member $a$, which if allowed to take place would enable the internal air pressure to bulge out the exposed end of the pneumatic member and bring it into contact with the bladed cylinder, which would cut the same and destroy the roll for practical purposes.

When the excessive external pressure is removed, the internal air moves the canvas sleeve $h$ outwardly into its normal position, and this movement by the internal air may be assisted by yielding means shown as springs 15, which are attached at one end to the sleeve $h$ and at their other end to a collar 16 fast on the journal $e$ as shown in Fig. 1, to revolve with the roll as a part thereof. The springs 15 may and preferably will be used when the sleeve $h$ is vulcanized to the pneumatic member $a$.

It will be observed that the canvas sleeve $h$ is of the same diameter throughout its length, which enables the sleeve to be made at the lowest cost, as a single sleeve may be made of any desired length within limits and then cut up into a number of sleeves, each capable of being readily slipped over the pneumatic member *a*. Furthermore, the ends of the canvas sleeve which extend beyond the pneumatic member, not only protect the latter from being uncovered as above described, but they also afford a support for the hide or skin to rest upon in a flat condition, and further enable the pneumatic roll to be made of substantially the same length as the ordinary rubber covered bed-roll, so that the pneumatic roll can be used on machines now in use, without necessitating any change in the bladed cylinders of said machines, that is, without beveling off the blades at the ends of the bladed cylinder and thereby shortening up on the working length of the bladed cylinder. In the present instance, the pneumatic member is shown as a rubber tube *a* which is helically wound about the shaft *b*, but it is not desired to limit the invention to this particular construction of pneumatic member.

Claims.

1. A pneumatic roll for machines of the character described, comprising a pneumatic member, and a work supporting substantially non-stretchable sleeve enveloping the pneumatic member and having its ends extended beyond the ends of the pneumatic member and free to move longitudinally in response to external pressure applied to the work supporting sleeve at a point between its ends, substantially as described.

2. A pneumatic roll for machines of the character described, comprising a pneumatic member, and a work supporting substantially non-stretchable sleeve enveloping the pneumatic member and having one of its ends free to move longitudinally in response to external pressure applied to the said sleeve at a point between its ends, substantially as described.

3. A pneumatic roll of the character described, comprising a pneumatic member, a center shaft to support said pneumatic member provided with headers between which the pneumatic member is confined against longitudinal movement, and a substantially non-stretchable sleeve enveloping said pneumatic member and said headers and having one of its ends free to slide on the header which it envelops, substantially as described.

4. A pneumatic work support for machines of the character described, comprising a pneumatic member, a work supporting substantially non-stretchable member covering said pneumatic member and having one of its ends free to move in response to external pressure applied to said covering at a point between its ends.

5. A pneumatic work support for machines of the character described comprising a pneumatic member, a work supporting substantially non-stretchable member covering said pneumatic member and having one of its ends free to move in response to external pressure applied to said covering at a point between its ends, and yielding means connected with said movable end, substantially as described.

In testimony whereof, I have signed my name to this specification in the presence of two subscribing witnesses.

HENRY A. HOLDER.

Witnesses:
 JAS. H. CHURCHILL,
 J. MURPHY.